(12) United States Patent
Nishino et al.

(10) Patent No.: US 8,471,901 B2
(45) Date of Patent: Jun. 25, 2013

(54) IMAGE INPUT MODULE ADJUSTING DEVICE AND IMAGE INPUT MODULE ADJUSTING METHOD

(75) Inventors: Toru Nishino, Kawasaki (JP); Koichi Shimamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 297 days.

(21) Appl. No.: 12/170,510

(22) Filed: Jul. 10, 2008

(65) Prior Publication Data

US 2009/0033787 A1 Feb. 5, 2009

(30) Foreign Application Priority Data

Aug. 2, 2007 (JP) ................................. 2007-202075

(51) Int. Cl.
*H04N 7/18* (2006.01)

(52) U.S. Cl.
USPC .................................. 348/95; 348/94; 348/87

(58) Field of Classification Search
USPC ....................... 348/345–357, 86–95, 187–190
See application file for complete search history.

(56) References Cited

U.S. PATENT DOCUMENTS

| | | | | |
|---|---|---|---|---|
| 7,403,229 | B2 * | 7/2008 | Knoedgen et al. ............ | 348/347 |
| 7,405,764 | B2 * | 7/2008 | Gustavsson et al. .......... | 348/374 |
| 2003/0025517 | A1 * | 2/2003 | Kiest et al. ..................... | 324/758 |
| 2004/0247203 | A1 | 12/2004 | Dell Eva | |
| 2005/0036778 | A1 * | 2/2005 | DeMonte ......................... | 396/89 |
| 2006/0042064 | A1 * | 3/2006 | Montfort et al. .............. | 29/407.1 |
| 2006/0092384 | A1 | 5/2006 | Kuroda | |
| 2006/0103754 | A1 * | 5/2006 | Wenstrand et al. ........... | 348/349 |
| 2006/0109372 | A1 | 5/2006 | Noji | |
| 2007/0165131 | A1 * | 7/2007 | Ish-Shalom et al. .......... | 348/345 |
| 2007/0177279 | A1 | 8/2007 | Cho et al. | |
| 2008/0201939 | A1 * | 8/2008 | Tsai ................................ | 29/722 |

FOREIGN PATENT DOCUMENTS

| | | |
|---|---|---|
| JP | U3074896 | 1/2001 |
| JP | 2001-304959 | 10/2001 |
| JP | 2006-064886 | 3/2006 |
| WO | WO2005/084013 | 9/2005 |

OTHER PUBLICATIONS

Office Action for European Patent Application No. 08160434.0, issued Dec. 3, 2009.
European Extended Search Report issued in corresponding European Patent Application No. 08160434.0, dated Sep. 25, 2008.

\* cited by examiner

*Primary Examiner* — Sinh Tran
*Assistant Examiner* — Christopher K Peterson
(74) *Attorney, Agent, or Firm* — IPUSA, PLLC

(57) ABSTRACT

An image input module adjusting device includes a board moving mechanism configured to movably hold a board in directions crossing each other; a board moving restriction mechanism configured to restrict movement of the board; an engaging member moving mechanism configured to move an engaging member engaged with a position adjusting component provided on the board; a control part configured to drive the engaging member moving mechanism while allowing the board moving restriction mechanism to move the board, to move and thereby the engaging member is engaged with the position adjusting component and the board is moved to an adjusting original position; a lens position adjusting mechanism configured to perform the position adjusting of the lens; and a focus adjusting mechanism configured to perform the focus adjusting of the lens relative to the image input sensor while the movement of the board is restricted.

2 Claims, 17 Drawing Sheets

IMAGE INPUT MODULE ADJUSTING DEVICE AND IMAGE INPUT MODULE ADJUSTING METHOD

BACKGROUND OF THE INVENTION

1. Field of the Invention

The present invention generally relates to image input module adjusting devices and image input module adjusting methods.

2. Description of the Related Art

Recently, image input sensors have been applied to various kinds of electronic apparatuses and used for imaging processes, identification processes and others. In an image input module having such an image input sensor, it is necessary to perform focusing of an image on the image input sensor. For focusing image on the image input, as discussed in Japanese Laid-Open Patent Application Publication No. 2006-64886, the position and the focus of a lens relative to the image input sensor are adjusted.

FIG. 1 shows an example of a related art image input module adjusting device (hereinafter "adjusting device 100"). FIG. 1(A) is a front view of the adjusting device 100, and FIG. 1(B) is a side view of the adjusting device 100.

Referring to FIG. 1, in an image input module 1, an image input sensor 5 is provided in a substantially center position of an upper surface of a board 2. A connector 6 is provided on a lower surface of the board 2. A lens 3 is fixed above the board 2 via a lens mount 4. Image input area adjusting (position adjusting) relative to the image input sensor 5, and focus adjusting of the lens 3 relative to the image input sensor 5 are performed by using the adjusting device 100.

In the adjusting device 100, a fixing base 112 having a device side connector 118 is provided on a base 111. The connector 6 is engaged with the device side connector 118 so that the board 2 is provided in the adjusting device 100. In the following explanation, a mounting position of the board 2 in the design of the adjusting device 100 is called a standard mounting position.

The adjusting device 100 includes an adjusting pattern 117, a lens moving mechanism 120, a motor 122 used for focus adjusting, a hand driving mechanism 124, and other parts for adjusting the image input area relative to the image input sensor 5 and focus adjusting of the lens 3 relative to the image input sensor 5 can be performed using the board 2.

In order to perform the adjusting process of the image input area relative to the image input sensor 5, the connector 6 is connected to the device side connector 118 so that the board 2 is mounted in the adjusting device 100. Thereby positioning of the image input sensor 5 provided above the board 2 and the adjusting pattern 117 provided in the adjusting device 10 is performed.

Next, the lens mount 4 where the lens 3 is connected is mounted on the board 2 and is supported by a hand 125 by driving the hand driving mechanism 124. The hand driving mechanism 124 is attached to a pillar 121 standing on the lens moving mechanism 120. The lens moving mechanism 120 can move on the base 111 in X and Y directions. The hand 125 is moved by the lens moving mechanism 120 via the hand driving mechanism 124 so that the lens 3 is moved above the board 2 in the X and Y directions and thereby the adjusting process of the image input area relative to the image input sensor 5 is performed.

After the adjusting process of the image input area is completed, the focus adjusting process of the lens 3 relative to the image input sensor 5 is performed. This focus adjusting process is performed by using the motor 122. A focus adjusting rotational belt 126 is wound around a lens side pulley 127 connected to the lens 3 and a motor side pulley 128 provided to an output axle of the motor 122.

Under this structure, the motor 122 is rotated so that the lens 3 is rotated via the motor side pulley 128, the rotational belt 126 for focus adjusting, and the lens side pulley 127. While a focus adjusting pattern provided at the adjusting pattern 117 is imaged by the image inputting sensor 5, the position where the lens 3 is focused on the image input sensor 5 is detected.

When this focus adjusting process is completed, the rotational belt 126 for focus adjusting and the lens side pulley 127 are taken out. Then the lens 3 and the lens mount 4 are adhered to each other by adhesive, and the lens mount 4 and the board 2 are adhered to each other. Thus, the adjusting process of the lens 3 relative to the image input sensor 5 is completed.

In the above-discussed adjusting device 100, positioning of the image input sensor 5 and the adjusting pattern 117 is made by engaging the connector 6 provided on the board 2 above which the image input sensor 5 is mounted with the device side connector 118. However, in this way, mounting errors ΔX1, ΔY1, ΔX2, and ΔY2 shown in FIG. 2 and FIG. 3 and engaging gaps ΔX3 and ΔY3 of the connector shown in FIG. 4 are generated.

FIG. 2 shows a mounting error generated when the image input sensor 5 is mounted above the board 2. In FIG. 2, a design sensor position DP1 indicated by a dotted line indicates a standard mounting area in the design of the image input sensor 5.

However, a mounting position where the image input sensor 5 is actually mounted would be a position indicated by a solid line in FIG. 2, that is shifted from the design sensor position DP1. In an example shown in FIG. 2, mounting errors ΔX1 and ΔY1 of the mounting position relative to the design sensor position DP1 are generated. Specific values of the mounting errors in an X direction (X1 and X2 directions) and a Y direction (Y1 and Y2 directions) are ΔX1=±0.1 mm and ΔY1=±0.1 mm, for example.

These mounting errors are generated, as shown in FIG. 3, when the connector 6 is mounted on the board 2. In FIG. 3, a design connector position DP2 indicated by a dotted line is a standard mounting position in the design of the connector 6. However, an actual mounting position of the connector 6 is a position indicated by a solid line in FIG. 3. Accordingly, mounting errors of ΔX2 and ΔY2 of the mounting position relative to the design sensor position DP2 are generated. Specific values of the mounting errors in an X direction and a Y direction are ΔX2=±0.1 mm and ΔY2=±0.1 mm, for example.

In addition, because the connector 6 is inserted in the device side connector 118 when the connector 6 is installed, gaps between the connector 6 and the device side connector 118, namely connector engaging gaps, are generated in an X direction and a Y direction as shown in FIG. 4(A) and FIG. 4(B). Specific values of the connector engaging gaps in an X direction and a Y direction are ΔX3=±0.05 mm and ΔY2=±0.05 mm, for example.

Because of this, when the connector 6 is provided to the device side connector 118, errors ΔXmax and ΔYmax of the board 2 relative to the standard mounting position in the design have values of sums of the mounting errors and the connector engaging gaps, namely ΔXmax=ΔX1+ΔX2+ΔX3=±0.25 mm, and ΔYmax=ΔY1+ΔY2+ΔY3=±0.25 mm.

For example, when a wide angle lens is used, shifts between the adjusting patterns 117 and the center position of the image input sensor 5 at the time of adjusting influence a visual shift after the adjusting. In order to minimize these errors, it is necessary to position the image input sensor 5 with high precision in the adjusting device. However, according to the above-discussed example, because errors of ±0.25 mm exist, sufficient precision of the image input sensor 5 position cannot be achieved.

In addition, the focus adjusting operation is performed by rotating the lens 3 so that engagement position of screw lands formed at a lower part of the lens 3 and screw grooves formed inside the lens mount 4 is changed, and the lens 3 goes up and down. FIG. 5 shows a focus adjusting mechanism where the focus adjusting rotational belt 126 is provided between the lens side pulley 127 and the motor side pulley 128.

However, according to the above-discussed mechanism, in a case where a necessary rotational torque becomes large due to the engagement of the lens 3, the rotational torque may be insufficient so that sliding may occur between the adjusting rotational belt 126 and each of the lens side pulley 127 and the motor side pulley 128. This is an obstacle to proper focus adjusting. In addition, in a case where a large torque is applied to the lens mount 4 for focus adjusting, a space or gap between the lens mount 4 and the board 2 may be generated. Light may enter into the lens 3 via this space so that an image may be deformed.

SUMMARY OF THE INVENTION

Accordingly, embodiments of the present invention may provide a novel and useful image input module adjusting device and an image input module adjusting method solving one or more of the problems discussed above.

The embodiments of the present invention may provide an image input module adjusting device and an image input module adjusting method whereby an adjusting process in an image input area and adjusting of the focus of a lens relative to an image input sensor can be performed with high precision.

One aspect of the present invention may be to provide an image input module adjusting device for adjusting position and focus of a lens relative to a board having an image input sensor, the image input module adjusting device including: a board moving mechanism configured to movably hold the board in X and Y directions crossing each other; a board moving restriction mechanism configured to restrict movement of the board by the board moving mechanism; an engaging member moving mechanism configured to move an engaging member engaged with a position adjusting component provided on the board; a control part configured to drive the engaging member moving mechanism while allowing the board moving restriction mechanism to move the board, to move and thereby the engaging member is engaged with the position adjusting component and the board is moved to an adjusting original position, the control part being configured to restrict movement of the board by the board moving restriction mechanism where the board is moved to the adjusting original position; a lens position adjusting mechanism configured to perform the position adjusting of the lens by moving the lens relative to the image input sensor while the movement of the board is restricted; and a focus adjusting mechanism configured to perform the focus adjusting of the lens relative to the image input sensor while the movement of the board is restricted.

Another aspect of the present invention may be to provide an image input module adjusting method whereby positioning and focus adjusting of a lens are performed relative to a board having an image input sensor, the image input module adjusting method including a step of mounting a lens mount holding the lens on the board; a step of causing the board to be movable in X and Y directions crossing each other where the lens mount is fixed so that an engaging part of the lens mount is engaged with a position adjusting component provided on the board and the board is moved to an adjusting original position; a step of restricting movement of the board where the board is situated in the adjusting original position; a step of moving the lens mount in the X and Y directions on the board being restricted to be moved so that position adjusting of the lens is performed relative to the image input sensor; and a step of performing the focus adjusting of the lens the position of the lens is adjusted.

Other objects, features, and advantages of the present invention will become more apparent from the following detailed description when read in conjunction with the accompanying drawings.

DETAILED DESCRIPTION OF THE PREFERED EMBODIMENTS

A description of embodiments of the present invention is given below, with reference to FIG. 6 through FIG. 24.

Figure 6:
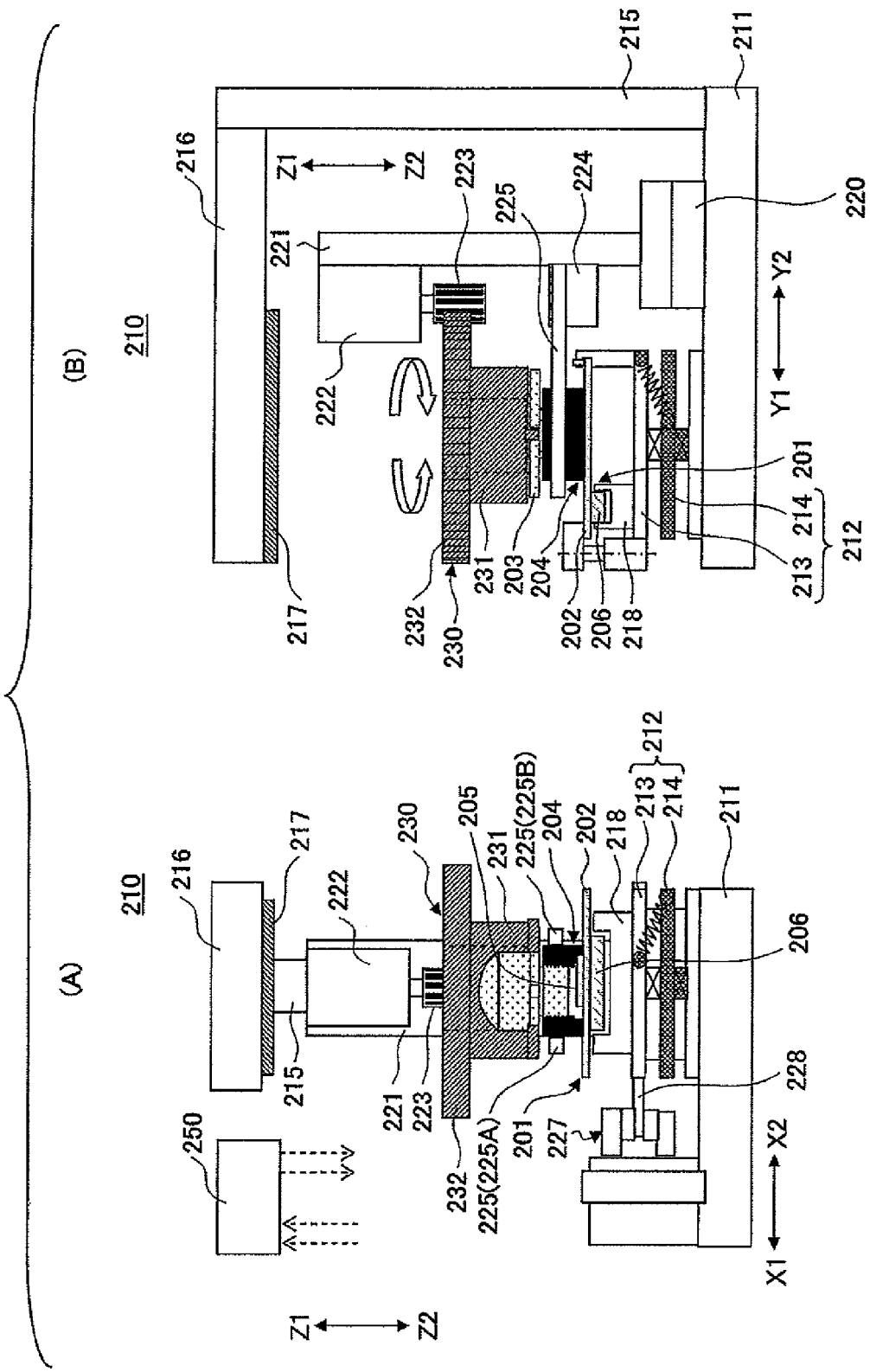
FIG. 6 is a structural view of an image input module adjusting device of an embodiment of the present invention.
Figure 7:
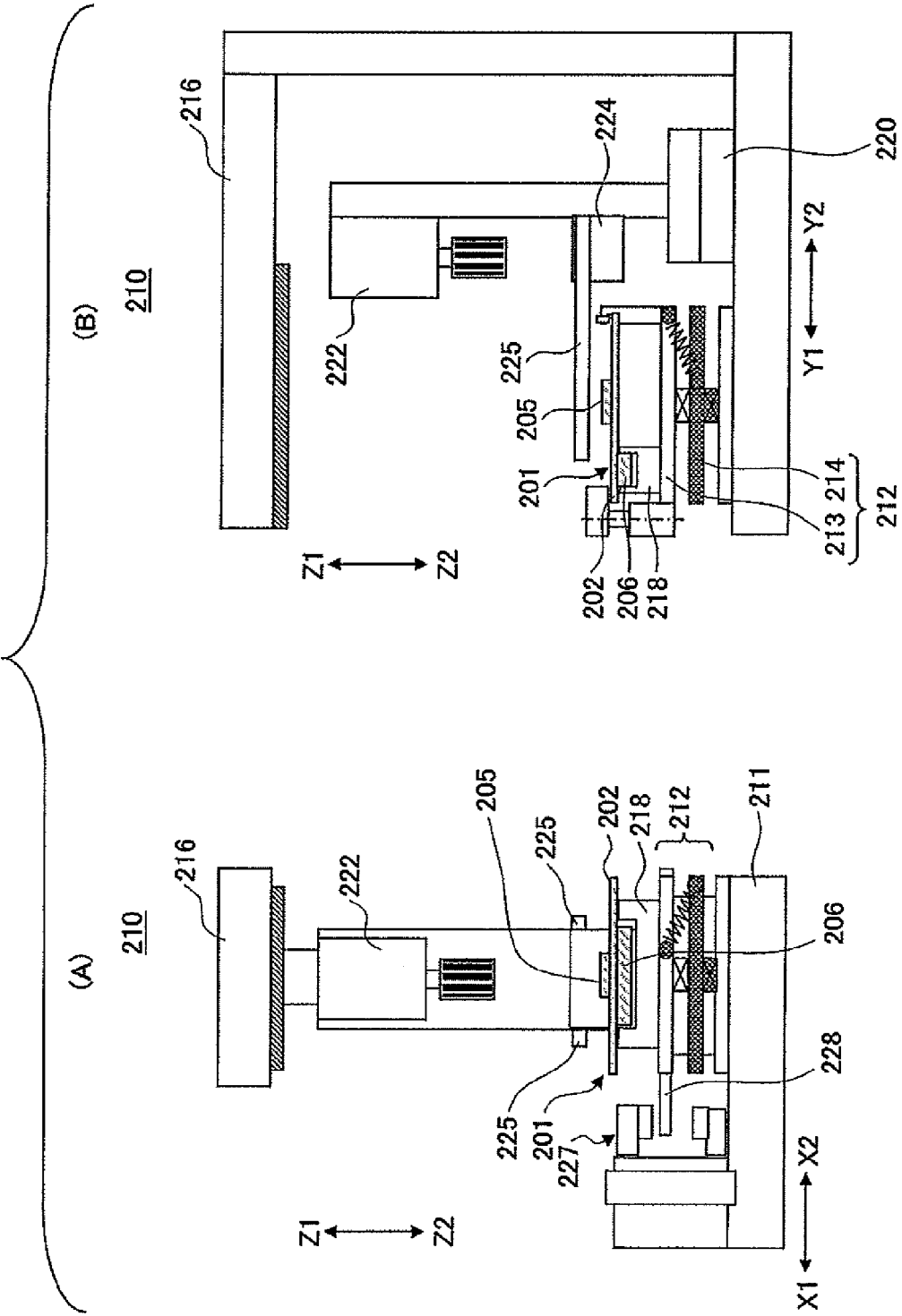
FIG. 7 is a first view for explaining a manufacturing method of the image input module of the embodiment of the present invention and shows a state where a board is provided in an image input module adjusting device.
Figure 8:
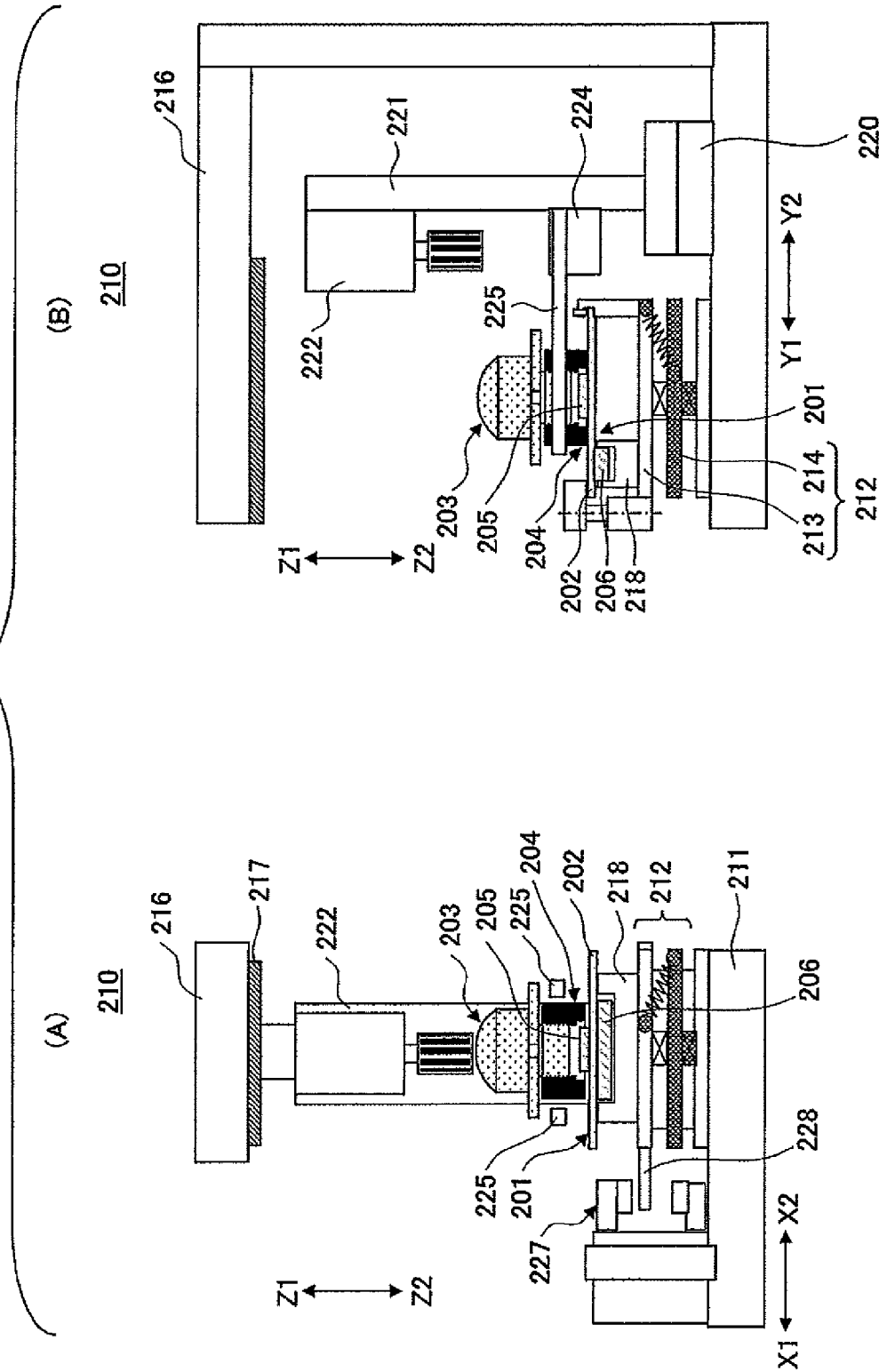
FIG. 8 is a second view for explaining the manufacturing method of the image input module of the embodiment of the present invention and shows a state where the lens is provided above the board.
Figure 9:
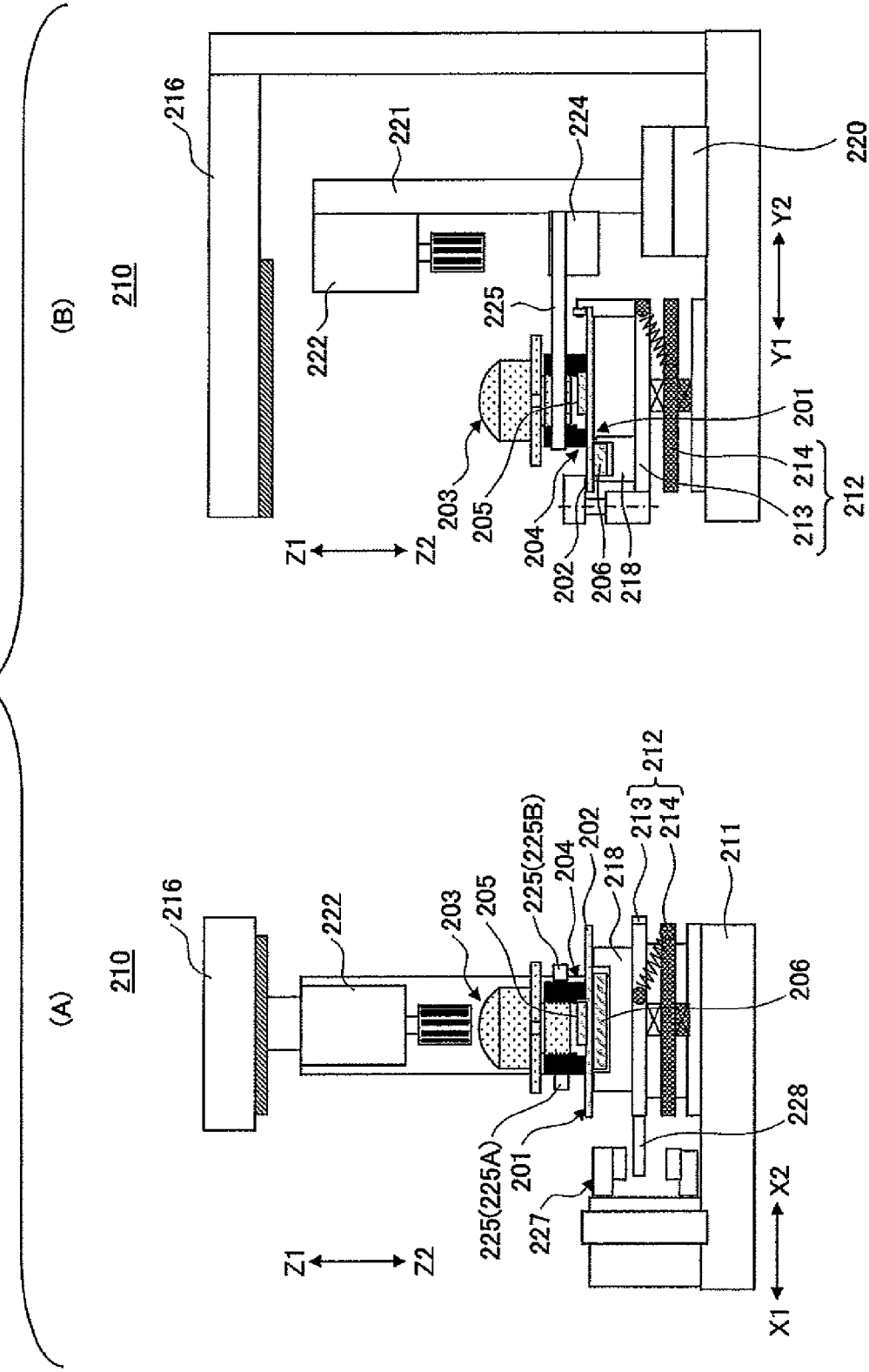
FIG. 9 is a second view for explaining the manufacturing method of the image input module of the embodiment of the present invention and shows a state where a lens mount is clamped by a hand.

FIG. 6 is a structural view of an image input module adjusting device 210 (hereinafter "adjusting device 210") of an embodiment of the present invention. FIG. 6(A) is a front view of the adjusting device 10, and FIG. 6(B) is a right side view of the adjusting device 210.

The adjusting device 210 includes a board moving mechanism 212, an adjusting pattern 217, a device side connector 218, a board movement limitation mechanism, an engaging member moving mechanism, a control member, a lens position adjusting mechanism, a focus adjusting mechanism, and other parts. The adjusting device 210 is used for adjusting and manufacturing an image input module 201.

In the image input module 201, an image input sensor 205 is provided in the substantially center position of an upper surface of a board 202. A connector 206 is provided on a lower surface of the board 202. A lens 203 is fixed above the board 202 by using a lens mount 204. Image input area adjusting (position adjusting) for the image input sensor 205 and focus adjusting of the lens 203 relative to the image input sensor 205 are performed by using the adjusting device 210.

Next, components of the adjusting device 210 are discussed. The board moving mechanism 212 is provided on a plane plate shaped base 211. The board moving mechanism 212 includes an X direction moving base 213 and a Y direction moving base 214. The Y direction moving base 214 is provided right above the base 211. The X direction moving base 213 is provided above the Y direction moving base 213. The device side connector 218 is provided for the X direction moving base 213.

The Y direction moving base 214 is moved with the X direction moving base 213 in directions indicated by arrows Y1 and Y2 in FIG. 6. The board moving mechanism 212 moves the device side connector 218 provided above the board moving mechanism 212 in directions indicated by arrows X1 and X2. Accordingly, the device side connector 218 can be moved in the X1 and X2 directions and in the Y1 and Y2 directions (namely plane surface directions) in FIG. 6 by the board moving mechanism 212.

As discussed below, the board 202 is fixed to the device side connector 218 by connecting the connector 206 to the device side connector 218. Accordingly, by driving the board moving mechanism 212, the board 202 can be moved in the X1 and X2 directions and in the Y1 and Y2 directions in FIG. 6. Driving of each of the moving bases 213 and 214 is controlled by a control device 250 discussed below.

The adjusting pattern 217 is used when image input area adjusting and focus adjusting discussed below is performed. The adjusting pattern 217 is provided in a position facing the board 202 in a state where the board 202 is mounted in the adjusting device 210. A pillar 215 stands on the base 211. A ceiling part 216 is fixed to the pillar 215 so as to be parallel with the base 211. The adjusting pattern 217 is provided on the lower surface of the ceiling part 216. Accordingly, when the image input sensor 205 is mounted in the board moving mechanism 212 above which the board 202 is provided, the board 202 and the image input sensor 205 face each other.

The board movement limitation mechanism includes a clamping mechanism 227 and an extending arm 228. The holding mechanism 227 uses, for example, a solenoid, an air cylinder, or the like. Driving of the holding mechanism 227 is controlled by the control device 250. In addition, the extending arm 228 extends from the X direction moving base 213 forming a part of the board moving mechanism 212. As discussed above, the board moving mechanism 212 moves the device side connector 218, or the board 202, in the plane surface direction and moves the extending arm 228 provided to the X direction moving base 213. The clamping mechanism 227 can clamp the extending arm 228 in a position where the extending arm 228 moves, regardless of the movement of the extending arm 228.

By clamping the extending arm 228 with the clamping mechanism 227, the board moving mechanism 212 limits movement of the X direction moving base 213. As discussed above, the device side connector 218 is provided on the X direction moving base 213. The connector 206 of the board 202 is connected to the device side connector 218. Accordingly, movement of the board 202 is restricted by the clamping mechanism 227 clamping the extending arm 28. However, the present invention is not limited to this example. As long as the movement of the board 202 is restricted by the board moving mechanism 212, other mechanisms or devices may be used.

The engaging member moving mechanism includes a lens moving mechanism 220, a hand driving mechanism 224, a hand 225, and other parts. The engaging member moving mechanism moves an engaging member configured to engage a position adjusting component provided on the board 202. In this example, the image input sensor 205 is used as a position adjusting component provided on the board 202. The lens mount 204 is used as an engaging member configured to engage the image input sensor 205.

The lens moving mechanism 220 stands on the base 211. A pillar 221 stands on the upper part of the lens moving mechanism 220. The hand driving mechanism 224 is provided in a designated position of the pillar 221. In addition, the lens moving mechanism 220 is connected to the control device 250. Based on a driving instruction of the control device 250, the pillar 221 moves in the X1, X2, Y1, and Y2 directions relative to the base 211.

The hand driving mechanism 224 includes a pair of the hands 225, namely a first hand 225A and a second hand 225B. The hand driving mechanism 224 is connected to the control device 250. Based on the driving instruction from the control device 250, the lens mount 204 is clamped and unclamped by the pair of the hands 225. The lens mount 204 is clamped by the pair of the hands 225 so as to be fixed. The lens moving mechanism 220 moves so that the lens mount 204 is fixed by the hand driving mechanism 224 and the hands 225 so that the lens mount 204 is also moved. In addition, the lens mount 204 moves where the lens 203 is provided in the lens mount 204 so that the lens 203 is also moved by the lens moving mechanism 220.

Here, structures of the lens 203 and the lens mount 204 are discussed with reference to FIG. 10 and FIG. 17.

Figure 10:
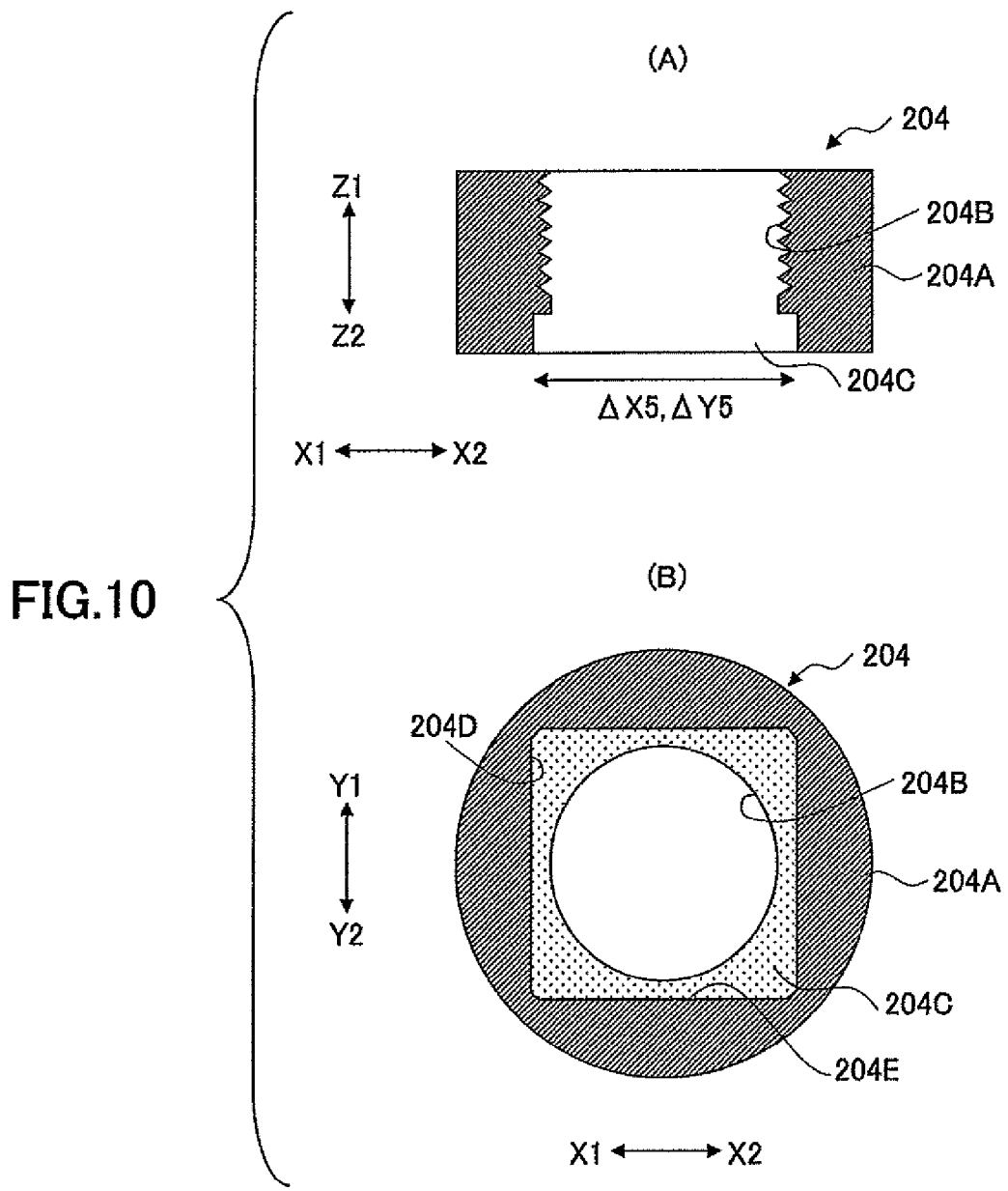
FIG. 10 contains views ((A): cut-open elevation and (B): bottom view) for explaining the lens mount used in the image input module adjusting device of the embodiment of the present invention.

FIG. 10 is a view for explaining the lens mount 204. The lens mount 204 includes a mount main body 204A, a lens mounting part 204B, and an inside space part 204C. The mount main body 204A is made of a cylindrical shaped resin or metal member. In a case where the mount main body 204A is formed by resin, a shading process is applied to the mount main body 204A so that permeation of light is prevented. More specifically, design precision of the lens mount 204 is approximately ±0.05 mm. Manufacturing unevenness $\Delta X5$ of the lens mount 204 is approximately ±0.02 mm. Manufacturing unevenness $\Delta Y5$ of the lens mount 204 is approximately ±0.02 mm.

The lens mounting part 204B is formed inside the lens mount 204 by screw grooves. A mounting part 203D of the lens 203 is screw-fixed to the lens mounting part 204B.

As shown in FIG. 10(B), the inside space part 204C is formed in a bottom part of the mount main body 204A. The inside space part 204C is a concave part having a rectangular shaped bottom surface configuration. The inside space part 204C includes an X direction side wall part 204D and a Y direction side wall part 204E. The X direction side wall part 204D and the Y direction side wall part 204E engage the image input sensor 205 as discussed below.

Figure 17:
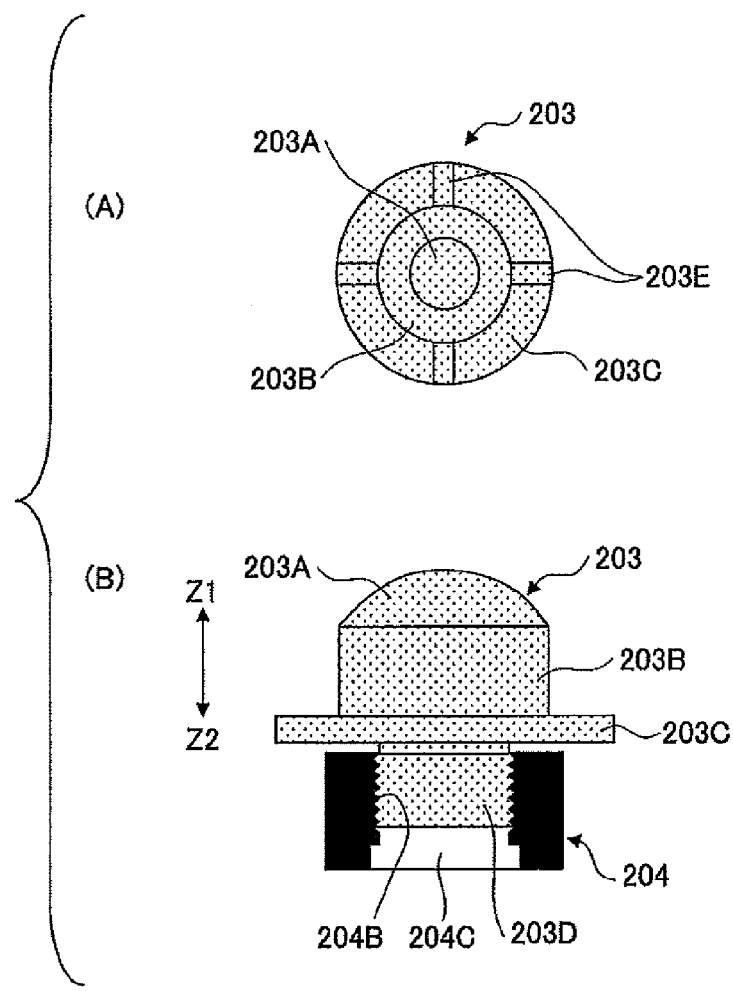
FIG. 17 contains views ((A): plane view and (B): front view where the lens is provided in the lens mount) of the lens used in the image input module adjusting device of the embodiment of the present invention.
Figure 18:
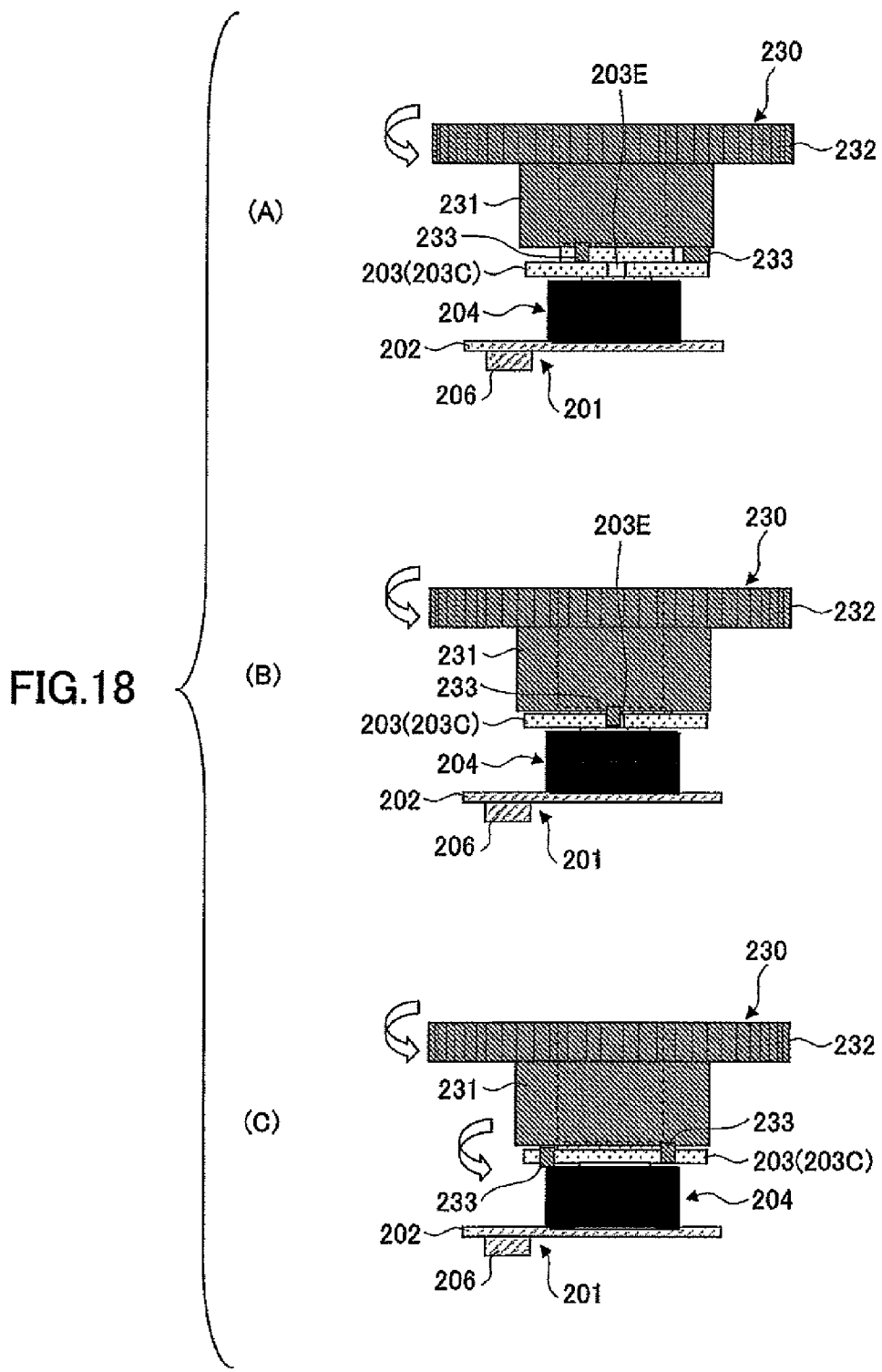
FIG. 18 is a sixth view for explaining the manufacturing method of the image input module of the embodiment of the present invention and shows a state where the lens is rotated by the lens rotation member.

FIG. 17 is a view for explaining the lens 203. FIG. 17(A) is a plan view of the lens 203 and FIG. 17(B) is a front view showing where the lens 203 is provided in the lens mount 204. A cross section of the lens mount 204 is indicated in FIG. 17(B).

The lens 203 is made of transparent resin. A lens main body 203A, a lens holder 203B, a brim part 203C, a mounting part 203D, and other portions are integrally formed on the lens 203. The lens main body 203A has a function of focusing the image onto the image input sensor 205. In addition, the lens holder 203B has a cylindrically shaped configuration. The lens main body 203A is formed on an upper end part of the lens holder 203B.

Furthermore, the brim part 203C is formed under the lens holder 203B. The brim part 203C has a diameter greater than that of the lens holder 203B. Plural grooves 203E for rotating the lens 203 are formed on the upper surface of the brim part 203C as shown in FIG. 17(A). In this example, four grooves 203E extend in radial directions with 90-degree intervals.

The mounting part 203D is formed under the lower part of the brim part 203C. The mounting part 203D has a cylindrically shaped configuration. Screw lands are formed on an external circumference of the mounting part 203D. These screw lands are screw-fixed to the screw grooves formed in the lens mounting part 204B of the lens mount 204. Accordingly, the lens 203 is rotated relative to the lens mount 204 so that the lens 203 is moved upward and downward in Z1 and Z2 directions relative to the lens mount 204 for adjusting the focus of the lens 203 or lens main body 203A.

Referring back to FIG. 6, discussion of the adjusting device 210 continues.

Where movement of the board 202 is restricted by the clamping mechanism 227, the lens position adjusting mechanism moves the lens 203 relative to the image input sensor 205, and adjusting of the image input area for the image input sensor 205, namely adjusting of a position of the lens 203, is implemented. In this example, where the lens 203 is provided in the lens mount 204, the lens 203 is moved by moving the lens mount 204 so that the image input area is adjusted.

Accordingly, the lens position adjusting mechanism has the same structure as that of the above-mentioned engaging member moving mechanism. In other words, the lens position adjusting mechanism includes the lens moving mechanism 220, the hand driving mechanism 224, and a pair of the hands 225. Under this structure, comparing a structure where the lens position adjusting mechanism and the engaging member moving mechanism are separately provided, it is possible to decrease the number of components, miniaturize the adjusting device 10, and reduce manufacturing costs.

The focus adjusting mechanism includes the lens moving mechanism 220 and the lens rotation member 230. This focus adjusting mechanism implements focus adjusting of the lens 203 relative to the image input sensor 205 where the movement of the board 202 is restricted by the clamp mechanism 227.

The focus adjusting motor 222 is provided at the upper part of the pillar 221. Therefore, the focus adjusting motor 222 moves together with the hand driving mechanism 224 and the hands 225 due to movement of the lens moving mechanism 220. An output shaft of the focus adjusting motor 222 extends downward, and a gear 223 is provided at an end part of the output shaft. In addition, the focus adjusting motor 222 is connected to the control device 250, and rotation of the focus adjusting motor 222 is controlled by the control device 250.

Figure 16:
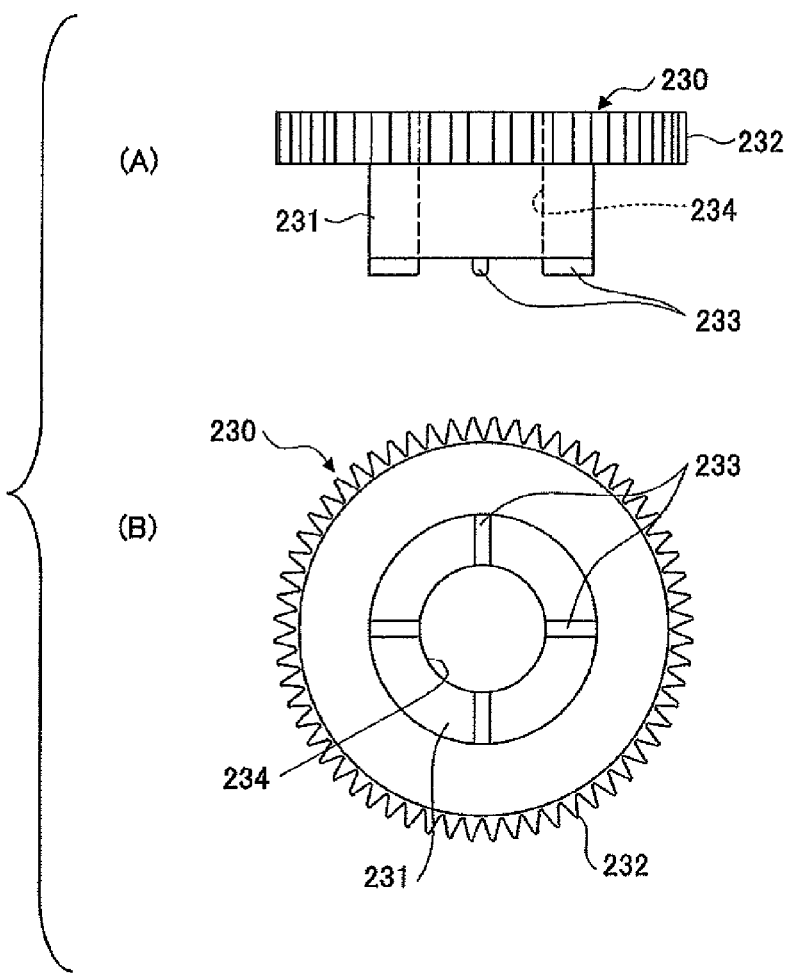
FIG. 16 contains views ((A): front view and (B): bottom view) for explaining a lens rotation member used in the image input module adjusting device of the embodiment of the present invention.

The lens rotation member 230 is provided to the lens 203. FIG. 16 shows the lens rotation member 230. FIG. 16(A) is a front view of the lens rotation member 230, and FIG. 16(B) is a bottom view of the lens rotation member 230. An arranging part 231, a gear part 232, an engaging convex part 233, and a hole 234 are integrally formed on the rotation member 230.

The arranging part 231 has a cylindrically shaped configuration. The hole 234 is formed inside the arranging part 231 where the lens 230 is inserted. The bottom surface of the arranging part 231 comes in contact with the brim part 230C when the lens rotation member 230 is provided to the lens 203.

Four engaging convex parts 233 extending in radial directions with 90-degree intervals are formed on the bottom surface of the arranging part 231. The engaging convex parts 233 correspond to the grooves 203E formed in the brim part 203C of the lens 203. Accordingly, when the lens rotation member 230 is arranged with the lens 203, the engaging convex part 233 is engaged with the grooves 203E.

The gear part 232 is provided on an upper part of the arranging part 231. The gear part 232 meshes with the gear 223 of the focus adjusting motor 222. Accordingly, where the lens mount 204 is fixed by the hands 250, the lens 3 is rotated via the focus adjusting motor 222, the gear 223, and the lens rotation member 230 so that the lens 203 moves upward and downward relative to the lens mount 204. Because the number of gear teeth of the gear part 232 is greater than the number of gear teeth of the gear 223, the rotational speed of the focus adjusting motor 222 is reduced and rotational torque is increased. Because of this, it is possible to stably rotate the lens 203 relative to the lens mount 204.

The control device 250 controls driving of the board moving mechanism 212, the board movement limitation mechanism, the engaging member moving mechanism (lens position adjusting mechanism), a control part, the focus adjusting mechanism, and others. Control operations of the control device 50 are discussed with the discussion below of the image input module adjusting method.

Next, the image input module adjusting method using the adjusting device 210 is discussed with reference to FIG. 7 through FIG. 20. In FIG. 7 through FIG. 20, parts that are the same as the parts shown in FIG. 6 are given the same reference numerals, and explanation thereof is omitted. Furthermore, in FIG. 7 through FIG. 20, illustration of the control device 250 is omitted.

In order to perform an adjusting process using the adjusting device 210 of the image input module 201, the board 202 is mounted in the adjusting device 210. The image input sensor 205 and the connector 206 are provided on the board 202 in advance. More specifically, as shown in FIG. 7(A) and FIG. 7(B), the board 202 is provided on the board moving mechanism 212 of the adjusting device 210 by connecting the connector 206 to the device side connector 218. At this time, the position of the image input sensor 205 mounted on the board 202 on the board moving mechanism 212 is slightly shifted from a standard mounting position of the image input sensor 205.

When the board 202 is provided on the board moving mechanism 212, the lens mount 204 and the lens rotation member 230 are taken out from the adjusting device 210. In addition, as controlled by the control device 250, clamping of the extending arm 228 by the clamping mechanism 227 is turned off; the lens moving mechanism 220 is stopped; the hand driving mechanism 224 is stopped where the pair of the hands 225 is opened; and the focus adjusting motor 222 is stopped.

After the board 202 is provided on the board moving mechanism 212, or adjusting device 210, as shown in FIG. 8(A) and FIG. 8(B), the lens 203 is mounted on the upper surface of the board 202. Where the lens 203 is provided on the lens mount 204, the lens 203 and the lens mount 204 are provided together on the upper surface of the board 202.

In addition, where the lens mount 204 as an engaging member is provided on the upper surface of the board 202, the image input sensor 205 as a position adjusting component is situated inside the inside space part 204C formed on the bottom part of the lens mount 204. While the mounting part 203D of the lens 203 is provided on the upper surface of the board 202 where the mounting part 203D is screw-fixed to the lens mounting part 204B of the lens mount 204, focus adjusting of the lens 203 is not implemented at this time.

After the lens 203 and the lens mount 204 are provided on the upper surface of the board 202, as shown in FIG. 9(A) and FIG. 9(B), the control device 250 drives the hand driving mechanism 224 so that the lens mount 204 is clamped by the pair of the hands 225. Because of this, the lens mount 204 is fixed by the hands 225 and the hand driving mechanism 224. This is called a lens mount fixing state.

However, in this lens mount fixing state, the board 202 can be moved in the X1, X2, Y1, and Y2 directions (plane surface direction) by the board moving mechanism 212. In other words, the board 202 can be moved relative to the lens 203, or lens mount 204.

Figure 12:
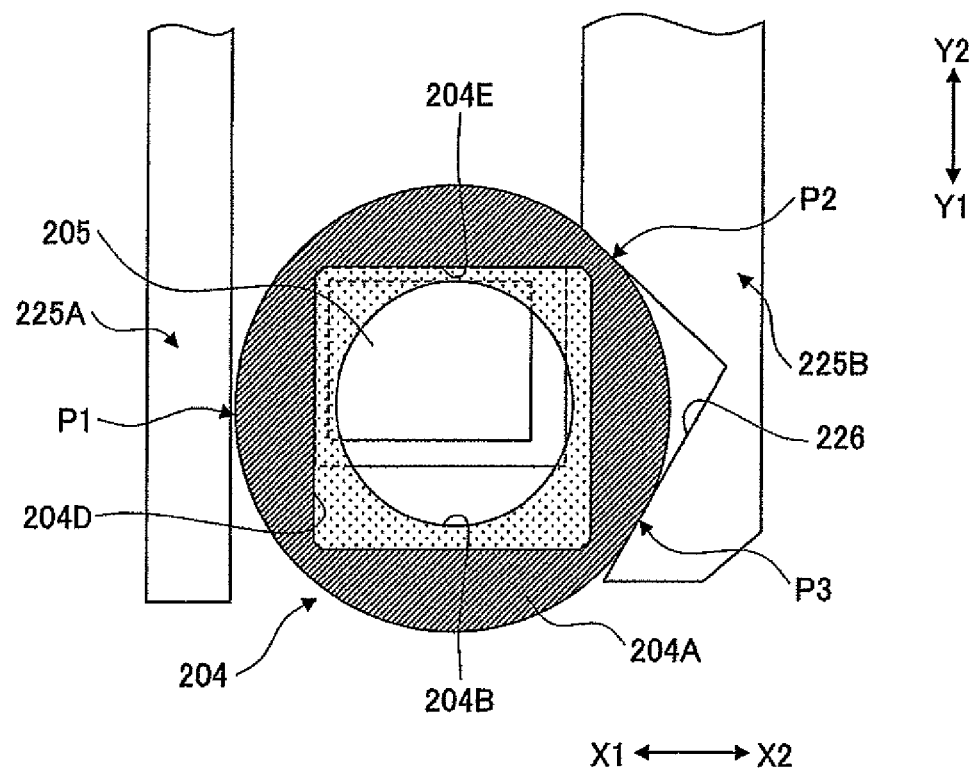
FIG. 12 is a plan view showing in an expanded manner a state where the lens mount is clamped by the hand.

FIG. 12 shows where the lens mount 204 is clamped by the pair of the hands 225, namely the first hand 225A and the second hand 225B. As shown in FIG. 12, a triangular groove 226 is formed in the second hand 225B. The lens mount 204 is positioned in this triangular groove 226. Accordingly, where the lens mount 204 is clamped by the first hand 225A and the second hand 225B, the lens mount 204 is supported, or fixed, at three points P1 through P3.

Furthermore, as discussed above, the lens mount 204 has a circular-shaped cross-sectional external configuration manufactured with high precision. Because of this, the lens mount 204 is positioned and supported or fixed with high precision by the first hand 225A and the second hand 225B. At this time, the position shift $\Delta X6$ when the lens mount 204 is clamped by the first hand 225A and the second hand 225B is approximately $\pm 0.005$ mm, and the position shift $\Delta Y6$ when the lens mount 204 is clamped by the first hand 225A and the second hand 225B is approximately $\pm 0.005$ mm.

As discussed above, the lens mount 204 is clamped by the pair of the hands 225, and the control device 250 drives the lens moving mechanism 220 so that the lens mount 204 is moved. As discussed above, the image input sensor 205 provided on the board 202 is positioned in the inside space part 204C formed at the bottom part of the lens mount 204. Therefore, when the lens mount 204 moves in the directions indicated by arrows X2 and Y2, two sides crossing each other of the image input sensor 205 having a rectangular-shaped configuration come in contact with the X direction side wall part 204D and the Y direction side wall part 204E formed in the lens mount 204. As a result, the lens mount 204 and the image input sensor 205 are engaged with each other.

The board 202 where the image input sensor 205 is mounted can be moved in planar surface directions in the adjusting device 210 because movement of the board moving mechanism 212 is not restricted by the clamping mechanism 227 at this time. Therefore, the lens mount 204, more specifically, the X direction side wall part 204D and the Y direction side wall part 204E, is engaged with the image input sensor 205. The lens mount 204 moves so that the image input sensor 205 is urged to move by the lens mount 204. Therefore, the board 202 moves together with moving of the lens mount 204.

The control device 250 performs driving control of the lens moving mechanism 220 so that the board 202 continues moving until the image input sensor 205 moves to a designated adjusted original position. When the image input sensor 205 moves to the adjusted original position, the control device 250 stops the moving of the lens mount 204 by the lens moving mechanism 220.

Figure 13:
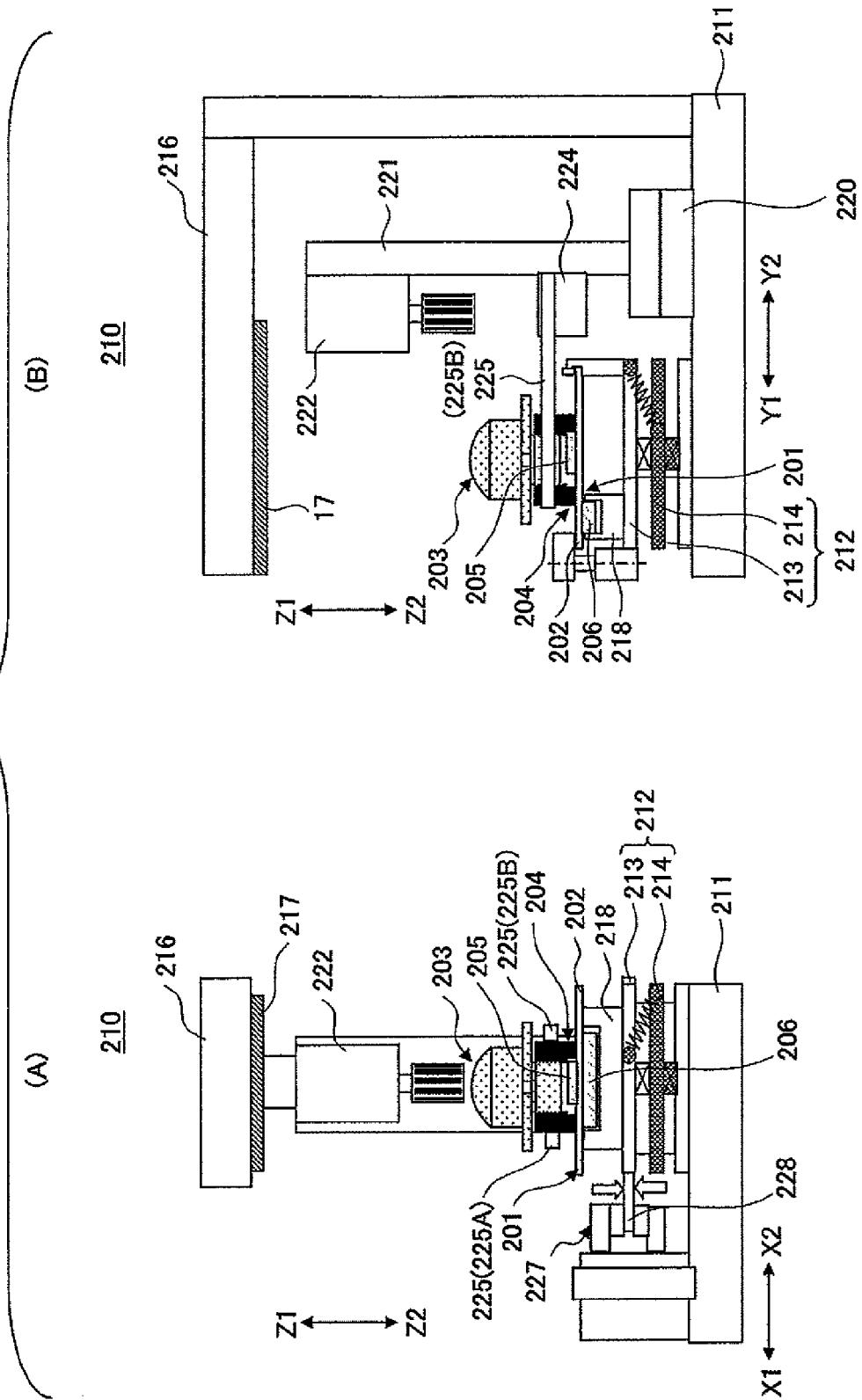
FIG. 13 is a third view for explaining the manufacturing method of the image input module of the embodiment of the present invention and shows a state where movement of the board moving mechanism is restricted by the clamping mechanism.

Next, the control device 250 drives the clamp mechanism 227 and clamps the extending arm 228 by using the clamping mechanism 227 as shown in FIG. 13. Because of this, movement of the board 202 is restricted so that the image input sensor 205 is fixed to the adjusted original position, and the adjusting pattern 217 provided between the image input sensor 205 and the adjusting device 210 is positioned.

Figure 11:
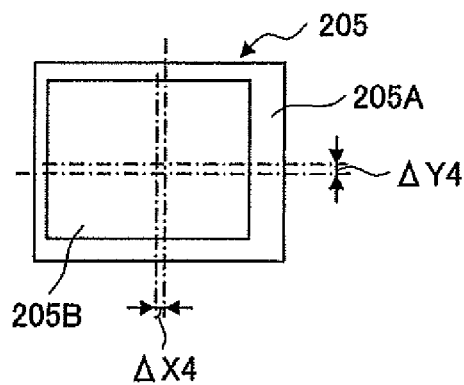
FIG. 11 is a view for explaining a timing shift generated in the image input sensor.

FIG. 11 shows the image input sensor 205 in an expanded manner. As shown in FIG. 11, in the image input sensor 205, a circuit forming area 205B is provided on an upper surface of a die 205A. Here, the die A is a semiconductor chip which is formed by dicing a semiconductor wafer. It is preferable that the center position of the die 205A and the center position of the circuit forming area 205B be consistent with each other. However, due to precision of dicing, a gap ($\Delta X4$ and $\Delta Y4$) is generated between the center position of the die 205A and the center position of the circuit forming area 205B. The length of the gap $\Delta X4$ is, for example, approximately $\pm 0.025$ mm and the length of the gap $\Delta Y4$ is, for example, approximately $\pm 0.025$ mm.

Figure 1:
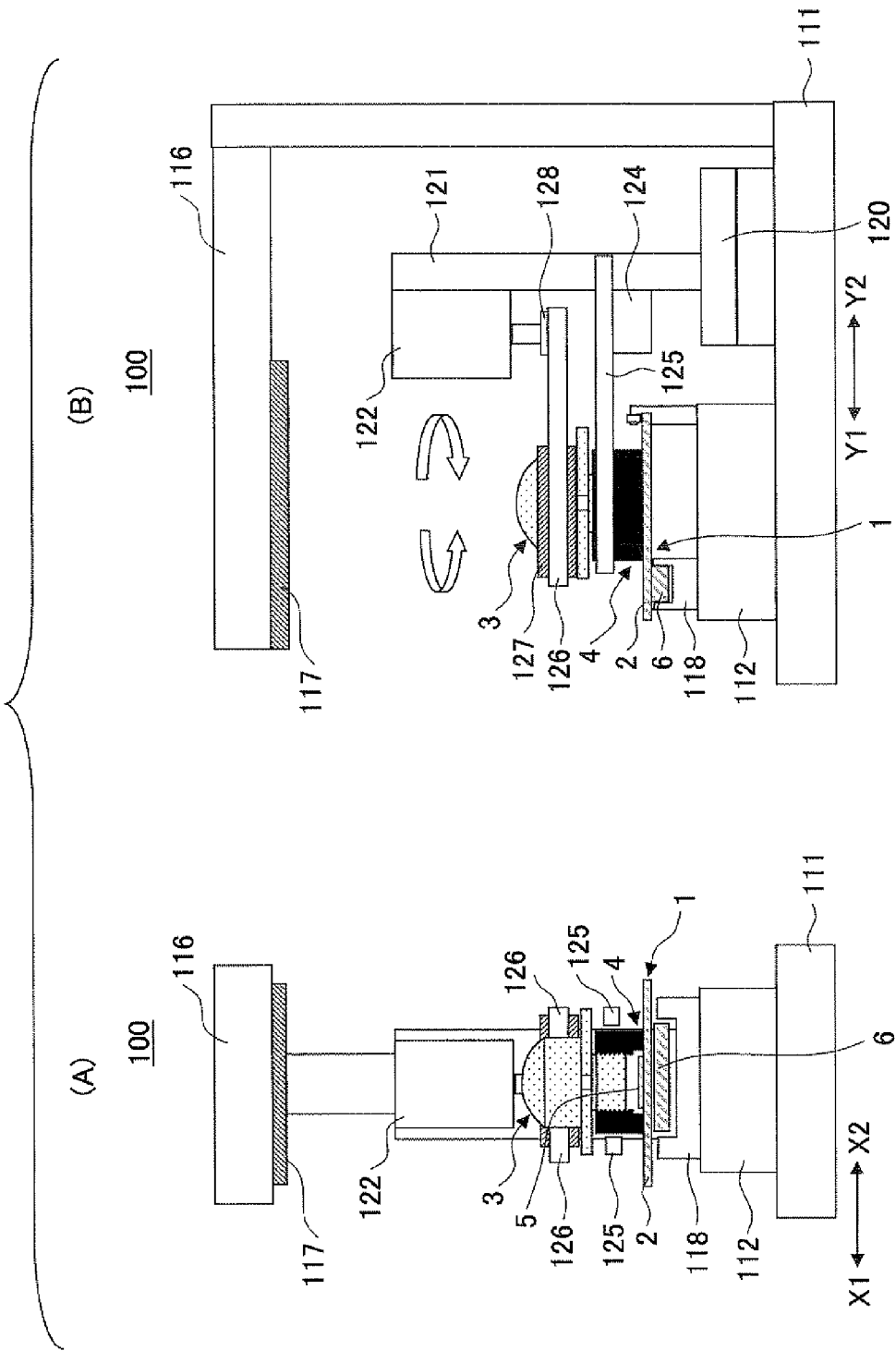
FIG. 1 is a view of an example of a related art image input module adjusting device.
Figure 2:
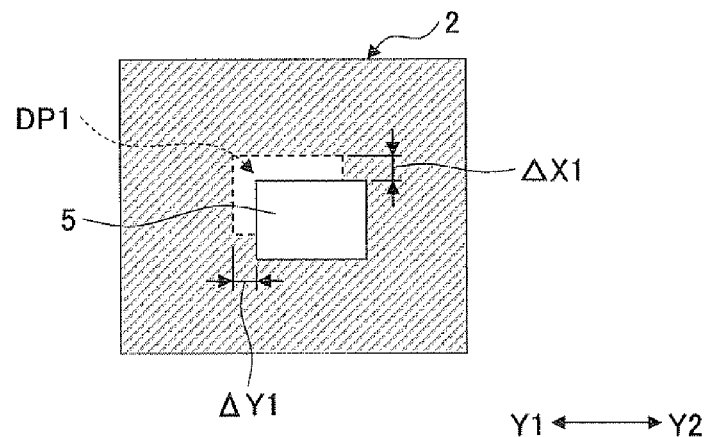
FIG. 2 is a view for explaining an image input sensor.
Figure 3:
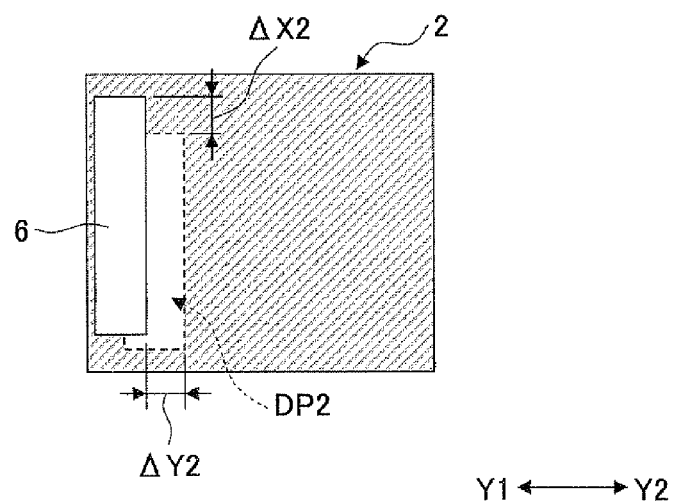
FIG. 3 is a view for explaining mounting errors of the connector.
Figure 4:
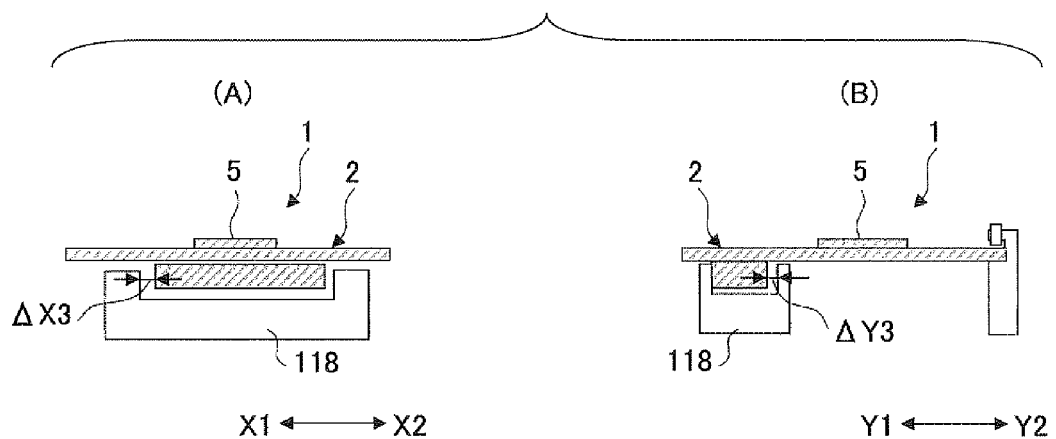
FIG. 4 is a view for explaining engaging gaps of the connector.
Figure 5:
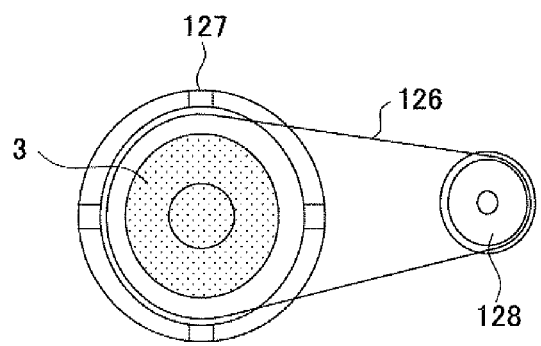
FIG. 5 is a view for explaining a related art focus adjusting mechanism.

Here, the position shift generated between the image input sensor 205 and the adjusting pattern 217 is discussed with comparison of the adjusting device 100 shown in FIG. 1.

In the adjusting device 100 discussed with reference to FIG. 1, a maximum value $\Delta X\max 1$ of the position shift of the image input sensor 5 relative to the adjusting pattern 17 is a sum of (i) a mounting error $\Delta X1$ of the mounting position of the image input sensor 205 relative to a design sensor position DP1, namely approximately $\pm 0.1$ mm, (ii) a mounting error $\Delta X2$ of the mounting position of the connector 206 relative to a design connector position DP2, namely approximately $\pm 0.1$ mm, and (iii) a connector engaging gap $\Delta X3$, namely approximately $\pm 0.05$ mm. A maximum value $\Delta Y\max 1$ of the position shift of the image input sensor of relative to the adjusting pattern 17 is the sum of (i) a mounting error $\Delta Y1$ of the mounting position of the image input sensor 205 relative to a design sensor position DP1, namely approximately ±0.1 mm, (ii) a mounting error ΔY2 of the mounting position of the connector 206 relative to a design connector position DP2, namely approximately ±0.1 mm, and (iii) a connector engaging gap ΔY3, namely approximately ±0.05 mm. More specifically, $$\Delta X\text{max}1 = \Delta X1 + \Delta X2 + \Delta X3 = \pm 0.25 \text{ mm}$$

$$\Delta Y\text{max}1 = \Delta Y1 + \Delta Y2 + \Delta Y3 = \pm 0.25 \text{ mm}$$

On the other hand, in this example, a maximum value ΔXmax2 of the position shift of the image input sensor 205 relative to the adjusting pattern 217 is the sum of (i) a gap ΔX4 between the center position of the die 205A and the center position of the circuit forming area 205B, namely approximately ±0.025 mm, (ii) manufacturing unevenness ΔX5 of the lens mount 4, namely approximately ±0.02 mm, and (iii) a shift amount ΔX6 at the time of fixing, namely approximately ±0.005 mm. A maximum value ΔYmax2 of the position shift of the image input sensor 205 relative to the adjusting pattern 217 is a sum of (i) a gap ΔY4 between the center position of the die 205A and the center position of the circuit forming area 205B, namely approximately ±0.025 mm, (ii) manufacturing unevenness ΔY5 of the lens mount 4, namely approximately ±0.02 mm, and (iii) a shift amount ΔY6 at the time of fixing, namely approximately ±0.005 mm. More specifically, $$\Delta X\text{max}2 = \Delta X4 + \Delta X5 + \Delta X6 = \pm 0.05 \text{ mm}$$

$$\Delta Y\text{max}2 = \Delta Y4 + \Delta Y5 + \Delta Y6 = \pm 0.05 \text{ mm}$$

Accordingly, in this example, compared to the example shown in FIG. 1, it is possible to position the image input sensor 205 with high precision relative to the adjusting pattern 217, and therefore it is possible to adjust the image input area and adjust the focus wherein the adjusting pattern 217 is used, with high precision.

Figure 14:
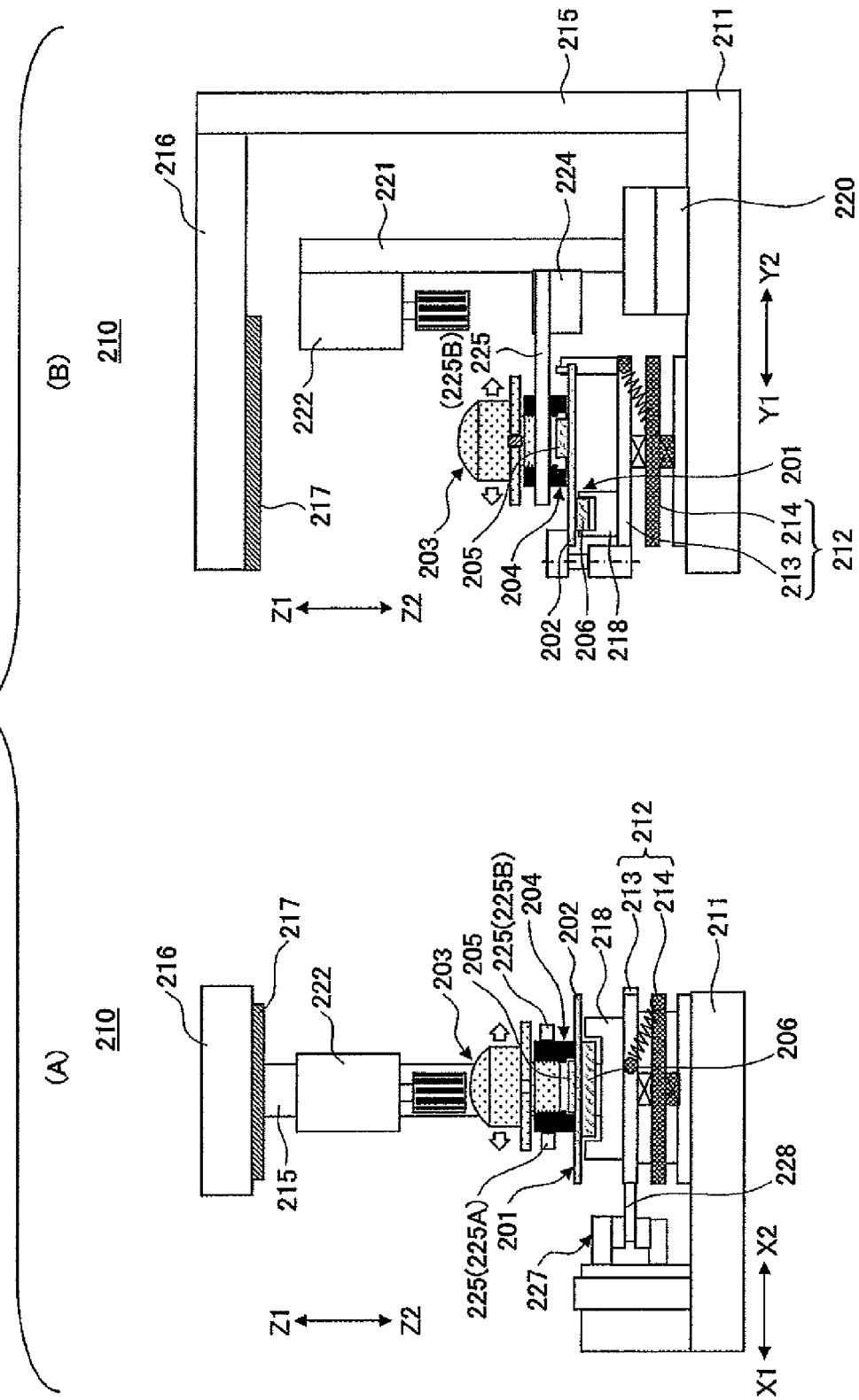
FIG. 14 is a fourth view for explaining the manufacturing method of the image input module of the embodiment of the present invention and shows a state where the lens is moved on a plane surface so that the image input area is adjusted.
Figure 15:
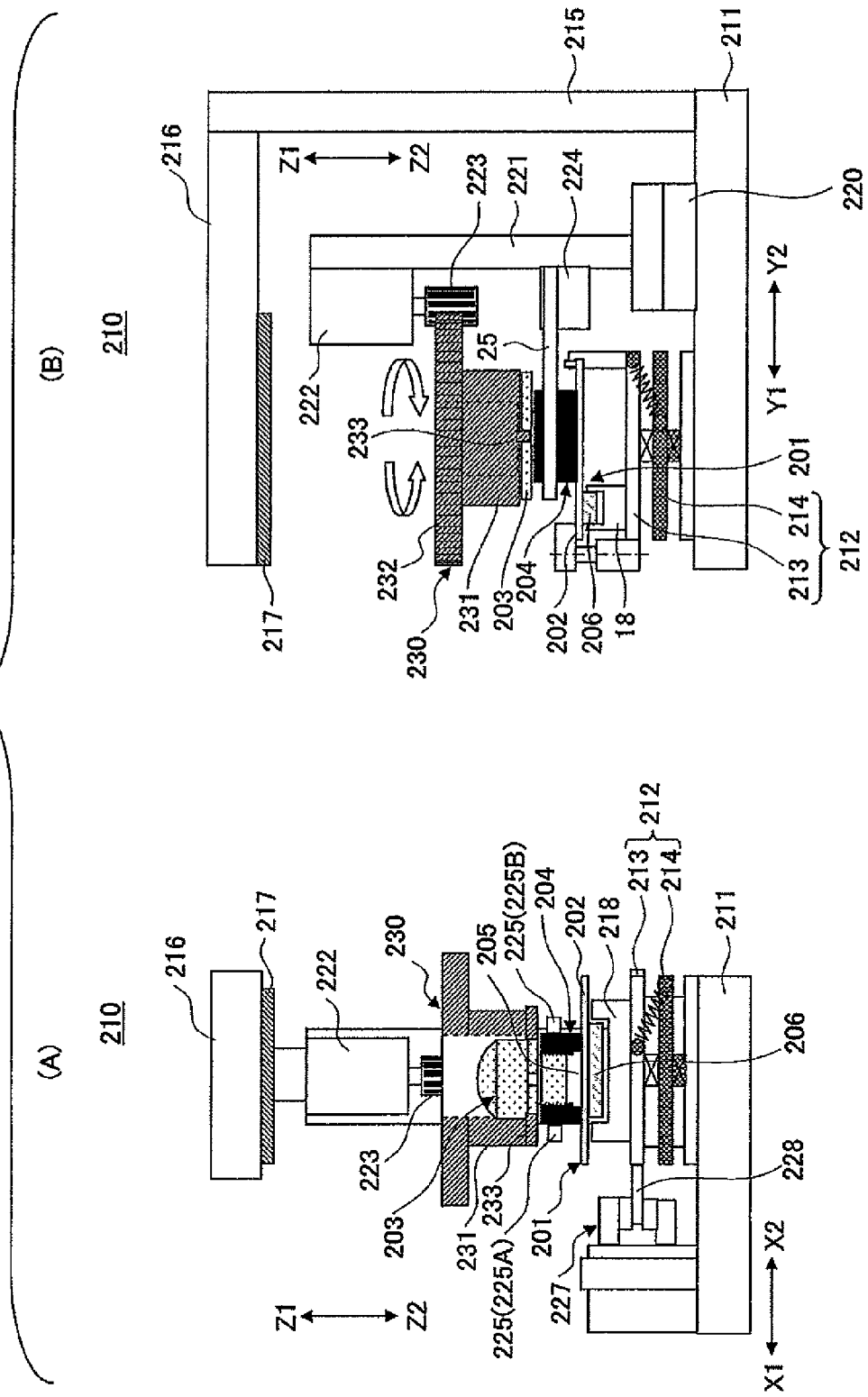
FIG. 15 is a fifth view for explaining the manufacturing method of the image input module of the embodiment of the present invention and shows a state where a focus of the lens is adjusted.

As discussed above, when positioning of the image input sensor 205 relative to the adjusting pattern 217 is completed, while the control device 250 restricts the movement of the board 202 by using the clamping mechanism 227, the control device 250 drives the lens driving mechanism 220 so that the lens mount 204 clamped by the pair of the hands 225 is moved on a planar surface of the board 202. Because the lens 203 is provided in the lens mount 204, a pattern for the image input area provided at the adjusting pattern 217 is imaged by the image input sensor 205. Based on the imaging data, the image input area of the image input sensor 205 is adjusted. FIG. 14 is a view showing a state where the image input area is adjusted.

After the adjusting process of the image input area is completed, the focus adjusting process of the lens 3 for the image input sensor 205 is implemented. In order to implement the focus adjusting process, the lens rotation member 230 is provided to the lens 203.

As discussed above, the engaging convex part 233 configured to engage the grooves 203E of the lens 203 is formed at the lower end of the mounting part 231 of the lens rotation member 230. In addition, the gear part 232 is provided at the lens rotation member 230. The gear part 232 meshes with the gear 223 where the lens rotation member 230 is provided to rotate the lens 203. Accordingly, as the focus adjusting motor 22 is driven for rotating, the lens rotation member 230 is rotated.

In addition, the lens rotation member 230 has sufficient weight so that the engaging convex part 233 can engage with the grooves 203E due to the own weight without applying a load to a part where the mounting part 203D and the lens mounting part 204B are screw-fixed. Accordingly, as shown in FIG. 18(A), even if the engaging convex part 33 is not engaged with the grooves 303E at the time when the lens rotation member 230 is provided to rotate the lens 203, the lens rotation member 230 is rotated by the focus adjusting motor 222 so that, as shown in FIG. 18(B), the engaging convex part 233 is rotated so as to approach the grooves 203E. As a result of this, as shown in FIG. 18(C), due to the own weight of the lens rotation member 230, the engaging convex part 233 is engaged with the grooves 203E.

Therefore, after the engaging convex part 233 is engaged with the grooves 203E, the lens 203 is synchronized with the lens rotation member 230 so as to be rotated. At this time the lens mount 204 remains fixed by the pair of hands 225. Accordingly, when the lens 203 is rotated the lens 203 goes up or down relative to the lens mount 204 depending on the amount and direction of rotation. As a result of this, it is possible to adjust focus of the lens 203, or the lens main body 203A, relative to the image input sensor 205.

At this time in this example, the rotational torque of the focus adjusting motor 222 is transmitted to the lens 203 by the gear 223 meshing with the gear part 232 and the engaging convex part 233 engaging the grooves 203E. Accordingly, there is no sliding at the time of rotation so that the lens 203 can be rotated with a constant rotational torque. Hence, even if a frictional force of the screw lands and grooves between the mounting part 203D of the lens 203 and the lens mounting part 204B of the lens mount 204 is large, it is possible to rotate the lens 203 stably.

Figure 19:
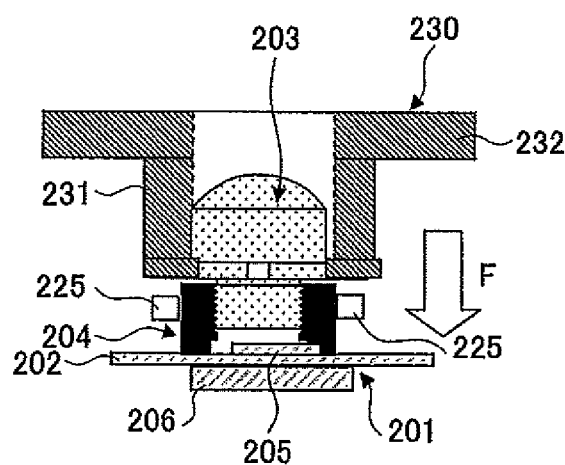
FIG. 19 is a seventh view for explaining the manufacturing method of the image input module of the embodiment of the present invention and shows a state where the lens is pressed toward the board by the lens rotation member.

In addition, as shown in FIG. 19, the own weight of the lens rotation member 230 is applied to the lens 203 (the brim part 203C) as indicated by an arrow F in FIG. 19. This force F is applied in a direction where the lens rotation member 230 is prevented from being separated from the lens 203 (the brim part 203C). Hence, it is possible to prevent the engaging convex part 233 from being removed from the grooves 203E without providing a separate release preventing mechanism. Therefore, it is possible to perform stable rotation of the lens 203 under this structure so that stable focus adjusting can be achieved.

Figure 20:
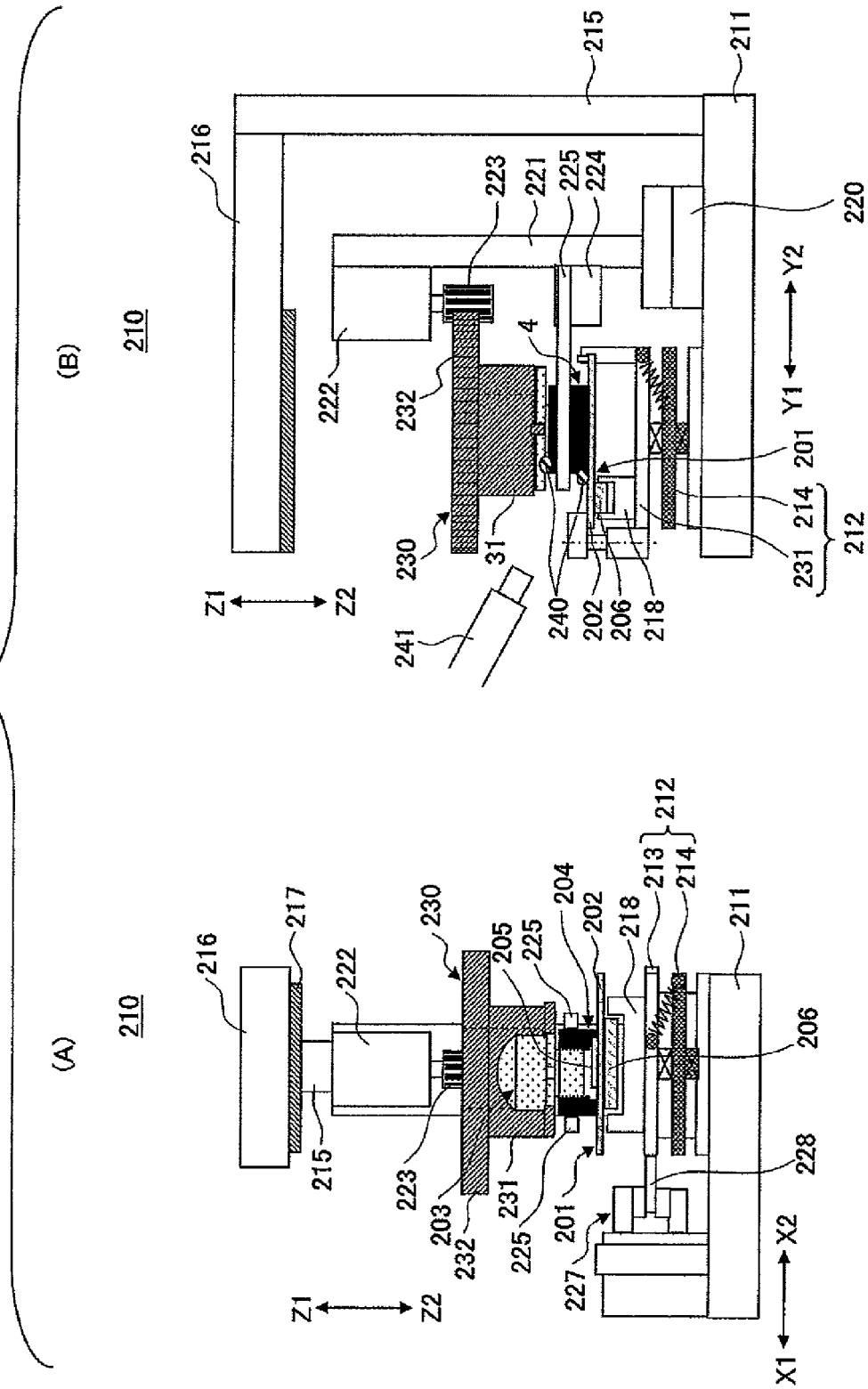
FIG. 20 is an eighth view for explaining the manufacturing method of the image input module of the embodiment of the present invention and shows a state where the lens and the lens mount are fixed to each other and the lens mount and the board are fixed to each other by a UV (ultraviolet) adhesive.

After the focus adjusting process is completed as discussed above, a fixing process is implemented. In this process, the lens mount 204 is fixed to the board 202 and the lens 203 is fixed to the lens mount 204. In this example, a UV (ultraviolet) adhesive 240 is used for the fixing process. FIG. 20 shows a state where the lens mount 204 and the board 202 and the lens 203 and the lens mount 204 are fixed to each other by using the UV adhesive 240.

The UV adhesive 240 is applied to designated positions by using a dispenser, for example. In addition, UV rays are applied to the applied UV adhesive 240 by using a UV fiber 41 so that the UV adhesive 240 is solidified. As a result, the lens mount 204 and the board 202 and the lens 203 and the lens mount 204 are fixed to each other by the UV adhesive 240. At this time, because the force F is applied to the brim part 203 due to the own weight of the lens rotation member 230, gaps are not generated between the lens mount 204 and the board 202 nor between the lens 203 and the lens mount 204. Hence, in the image input module 201, it is possible to prevent outside light from entering into the lens mount 204 so that degradation of the image quality can be prevented.

According to the embodiment, the board can be moved in X and Y directions crossing each other where the lens mount is fixed. Hence, the engaging part provided at the lens mount is engaged with the position adjusting component provided on the board. By moving the engaging part further, the board is moved to the adjusted original position. Thus, the board is directly moved and positioned in the adjusting original position so that any influence of position shift or any unevenness for positioning is reduced. Hence, it is possible to position the board in the adjusting original position with high precision.

Furthermore, the lens rotation member includes the mounting part where the lens is provided and the gear part formed at an external circumference of the mounting part. The driving device meshes with the gear part so that the lens rotation member is rotated. Therefore, a force to be transmitted becomes greater and the lens can be stably rotated relative to the lens mount.

The focus adjusting mechanism presses the lens rotation member to the board and rotates the lens rotation member. Therefore, separation of the lens mount from the board can be prevented and degradation of the image quality due to the light leaking from a gap between the lens mount and the board can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

For example, four grooves 203E and engaging convex parts 233 are provided in the above-discussed example. However, the present invention is not limited to this example. Two grooves 203E and engaging convex parts 233 may be provided. It should be noted that it is preferable to provide three or more grooves 203E and engaging convex parts 233 so that rotational operations until the grooves 203E and the engaging convex parts 233 are engaged with each other can be stable.

In addition, it is possible to automate a process for mounting the lens 203 (the lens mount 204) on the board 202 and a process for providing the lens rotation member 230 to rotate the lens 203. Under this structure, it is possible to perform the adjusting process with high efficiency.

This patent application is based on Japanese Priority Patent Application No. 2007-202075 filed on Aug. 2, 2007, the entire contents of which are hereby incorporated herein by reference.

What is claimed is:

1. An image input module adjusting device for adjusting position of a lens mount relative to a board having an image input sensor, the image input module adjusting device comprising:
a board moving mechanism configured to movably hold the board in X and Y directions crossing each other;
a board moving restriction mechanism configured to control a fixing state of the board and a movable state of the board;
an engaging member moving mechanism configured to move the lens mount in the X and Y directions;
a control part configured to drive the engaging member moving mechanism to move the lens mount while allowing the board moving restriction mechanism to move the board, the control part being configured to drive the engaging member moving mechanism to move the lens mount to cause the image input sensor and the board to move to an adjusting original position after the lens mount comes in contact with the image input sensor, the control part being configured to cause the board moving restriction mechanism to fax the board at the adjusting original position.

2. An image input module adjusting method whereby positioning adjustment of a lens is performed relative to a board having an image input sensor, the image input module adjusting method comprising:
causing the board to be movable in X and Y directions;
moving a lens mount to contact with the image input sensor mounted on the board;
moving the lens mount to move the image input sensor together with the board to an adjusting original position;
fixing the board where the board is at the adjusting original position; and
moving the lens mount on the board for adjusting an image input area of the image input sensor.

* * * * *